United States Patent [19]

Duguay

[11] Patent Number: 4,989,933
[45] Date of Patent: Feb. 5, 1991

[54] GUIDED LIGHT DIFFUSER

[76] Inventor: Michel A. Duguay, 825 Beauregard, Apt. 818, Saint-Foy, Quebec, Canada, G1V 4L7
Melanie L. Light, 52 West 74th Street, P.O. & Box No. New York, New York 10023

[21] Appl. No.: 342,559

[22] Filed: Apr. 24, 1989

[51] Int. Cl.$^5$ .................... G02B 6/00; G02B 6/14; F21V 7/04
[52] U.S. Cl. .................... 350/96.10; 362/31
[58] Field of Search ............ 350/96.10, 96.15, 96.16, 350/96.18, 96.20, 96.21, 622; 362/31, 32

[56] References Cited

U.S. PATENT DOCUMENTS

| | | | |
|---|---|---|---|
| 4,260,220 | 7/1981 | Whitehead | 350/96.28 |
| 4,642,736 | 2/1987 | Masuzawa et al. | 362/31 |
| 4,648,690 | 3/1987 | Ohe | 350/321 |
| 4,729,068 | 3/1988 | Ohe | 362/31 |
| 4,839,898 | 6/1989 | Payne et al. | 350/96.15 X |

OTHER PUBLICATIONS

"Photosensitive Optical fibers used as vibration Sensors" by La Rochelle, 1990 Optical Society of America.
"Dispersion cancellation using linearly chirped Bragg grating filters in optical waveguides", Optics Letters, vol. 12, p. 847, Oct. 1987.
"Narrow-band Bragg reflectors in optical fibers", Optical Society of America, 1978; Aug., vol. 3, No. 2.

*Primary Examiner*—Akm Ullah

[57] ABSTRACT

An apparatus is described for efficiently transforming light from concentrated sources into uniform diffse light. The apparatus comprises (1) a light guide resonator which comprises (A) a light guide and (B) mirrors for reflecting light back into the light guide; (2) means for injecting light from a light source into the light guide resonator; and (3) a light-diffusing element placed within the field distribution of the light in the resonator, the whole apparatus being designed to set up a regime of optical resonance. The light guide resonator is uniformly filled with light; within the resonator the uniformly lit light-diffusing element acts as an efficient light source of uniform brightness.

10 Claims, 5 Drawing Sheets

GUIDED LIGHT DIFFUSER

BACKGROUND OF THE INVENTION

1. Technical Field of the Invention

The present invention pertains to the field of devices which produce uniform diffuse light over a variety of geometries including straight rectangular light-guiding plates and curved light pipes.

2. Description of the Related Art

Many sources of light, whether they are electrical in nature, like lamps and lasers, or natural, like direct sunlight, produce light in a spatially concentrated form. This is especially true of laser light and sunlight at the focus of a lens, but it is also true of commercial lamps in general, like incandescent and fluorescent lamps, and it is notably true of halogen lamps. For many applications in lighting, such as for advertising and for use in rear face illumination of liquid crystal displays, a means for uniformly and efficiently diffusing the light has to be introduced in the path from the concentrated source to the user.

An example of such a diffuse light source is a light-box. The traditional approach to fabricating a light-box has been to place an array of fluorescent lamps behind a piece of strongly diffusing glass. As the lamps age, invariably one lamp becomes dimmer than the others and the brightness of the light-box becomes noticeably nonuniform. An additional drawback of such a light-box is that it is bulky, and, as a result, it cannot easily be put on a wall, certainly not in homes, and it does not meet the specifications of light weight and compactness which is required for a liquid crystal display. An additional drawback of the traditional approach to building a light-box is that the number of configurations is limited and, as a result, a light box is limited to a small number of applications.

An alternative approach to providing a diffuse light source, which has attracted growing interest lately, is based on the use of guided light in edge-lighted devices. U.S. Pat. No. 4,648,690 issued to Makoto Ohe on Mar. 10, 1987 and assigned to Mitsubishi Rayon Company, Ltd., discloses an edge-lighted device wherein light from one or more fluorescent lamps is coupled into the edges of a transparent slab comprised of, for example, acrylic plastic. By the process of total internal reflection the transparent slab guides the light between its top and bottom surfaces. The top surface of the transparent slab is covered by a layer of light-diffusing material which is a layer of alkyl methacrylate polymer into which particles of titanium dioxide ($TiO_2$) powder have been mixed. Some of the light guided by the transparent slab is diffused by the $TiO_2$ particles in the top layer, to provide a source of diffuse light.

As noted in the above-mentioned patent a problem with edge-lighted devices is that the brightness of the diffused light is nonuniform, specifically, the brightness is higher near the edge where the light is entering the transparent slab and drops off as the light propagates into the region away from this edge. In fact the above-mentioned patent discloses an additional diffusing layer to ameliorate the nonuniformity problem. Notwithstanding the use of this extra layer the apparatus of the above-mentioned patent does not resolve the problem of a gradual decrease of the injected light beam as it propagates down the transparent slab. The further the light beam propagates, the weaker the beam becomes, and the harder it becomes to extract from it diffuse light of the same brightness as one obtains near the edge of the transparent slab where light is injected. After a certain propagation length in the slab the light beam is so weak that it is no longer possible to extract diffuse light from it with the brightness level required to maintain the desired degree of uniformity in the diffuse light over the entire slab.

Another edge-lighted device is disclosed in U.S. Pat. No. 4,642,736, issued on Feb. 10, 1987, to Tokihiko Masuzawa, Yoshitaka Kageyama, and Norizou Tomita, and assigned to Mitsubishi Rayon Company, Ltd. This patent describes an attempt at achieving uniform illumination by using a plurality of light transmission plates set an angle to the face-plate of the display. The disclose edge-lighted device suffers from the drawback of complexity in design and manufacturing and would require very fine tuning for each particular application in order to achieve substantial uniformity in the brightness of the diffused light.

The structures described in the above-mentioned and other previous art exhibit a certain degree of complexity and have not satisfactorily resolved the issue of obtaining both brightness uniformity and high efficiency. This is due in large measure to the fact that they have not addressed the fundamental problem of extracting diffuse light of uniform brightness from a beam of light whose intensity steadily decreases as it propagates. Moreover they are designed for very specific applications requiring a well-defined geometry so that they cannot be applied in a general way to a wide variety of geometries in a straightforward fashion.

SUMMARY OF THE INVENTION

The embodiments of the present invention solve the above-identified problems in the art by providing an efficient source of uniform diffuse light which can be used in a wide variety of geometries in a straightforward way.

An embodiment of the guided light diffuser of the present invention comprises: (1) a light guide resonator which comprises (A) a light guide and (B) mirrors or equivalent means for reflecting most of the light back into the light guide; (2) means for injecting light into the light guide resonator; and (3) a light-diffusing element placed within the light field distribution in the resonator in such a way that a regime of optical resonance prevails in the light guide resonator. For the purpose of the present invention a regime of optical resonance is said to prevail when a light ray injected into the resonator and undergoing one round trip in the resonator, returns on the average with at least one quarter of its initial intensity and with substantially the same angle to the surface normal of the entrance face of the resonator as it had at injection.

Under proper light injection conditions, as a result of the creation of the regime of optical resonance, the full volume of the light guide resonator is filled substantially uniformly with light, and the light-diffusing element is thereby lit to provide a substantially uniform and efficient source of diffuse light. In the present invention, because a regime of optical resonance is created, the injected light advantageously undergoes a plurality of round trips in the resonator, thereby leading to substantially uniform and efficient diffuse illumination.

In a preferred embodiment a light-diffusing substance, such as titanium dioxide ($TiO_2$) particles in fine powder form, is admixed into a low-index transparent medium that forms a cladding for the light guide. In such an embodiment the $TiO_2$ particles diffuse or scatter light from the evanescent part of the light field distribution of the light guide resonator. Further, one must keep the concentration of the light-diffusing $TiO_2$ particles low enough so that only a relatively small optical loss is introduced into the light guide resonator in order to insure that a regime of optical resonance prevails.

Embodiments of the present invention provide two important benefits which arise from the creation of a regime of optical resonance in the invented apparatus:

1—the light-diffusing element is uniformly lit, thereby giving rise to a source of diffuse light of substantially uniform brightness 2—the efficiency with which injected light is transformed into useful diffuse light is very high, being capable in theory of approaching or exceeding 90% under ideal conditions.

DETAILED DESCRIPTION OF THE PREFERRED EMBODIMENTS

Figure 1:
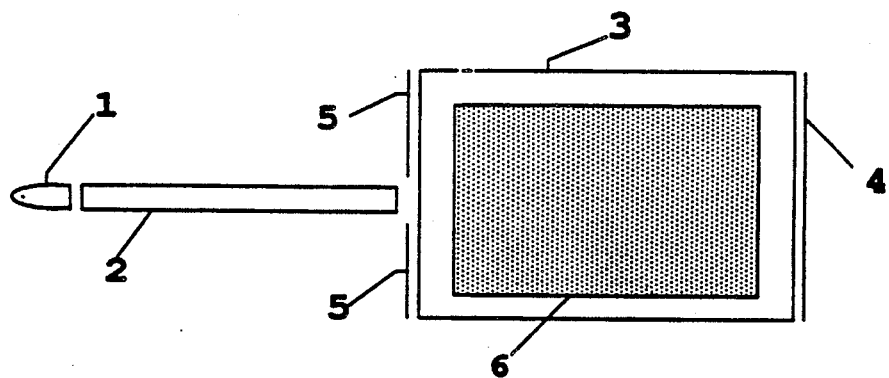
FIG. 1 illustrates a top view of one embodiment of the invention where the light guide is a rectangular slab of transparent plastic or glass; the inner rectangle is the boundary of a light-diffusing medium affixed to the bottom surface of the transparent slab.
Figure 2:
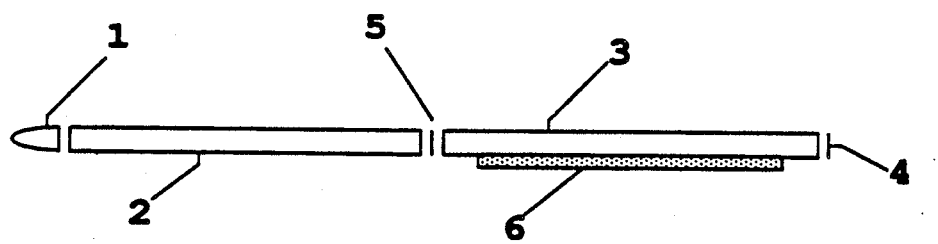
FIG. 2 illustrates a side view of the embodiment of FIG. 1 showing the layer of light-diffusing medium affixed to the bottom surface of the transparent slab.

Referring to FIGS. 1 and 2 there is shown one of the preferred embodiments of the guided light diffuser where the light guide resonator comprises a rectangular slab 3 of a highly transparent medium, such as acrylic plastic or low-loss optical glass, and highly reflecting mirrors 4 and 5 as shown. All faces and edges of the transparent slab are flat and polished smooth and are all at substantially 90 degrees to one another. Highly reflecting mirrors 4 and 5 have coatings, disposed next to the edges of the transparent slab, which are dielectric, or enhanced aluminum, or protected silver, in order to give maximum durable reflectivity. It is well known to those of ordinary skill in the art as to how reflectivities between 95% and 99% over the whole visible range can be achieved. Mirrors 4 and 5 are substantially flat, parallel to one another and to the edges of the rectangular transparent slab. Mirrors 4 and 5 are held in close proximity to the edges of the transparent slab by means of an optically transparent glue, for example.

One or both reflecting mirrors 4 and 5 have one or more relatively small apertures, as shown, through which light from concentrated sources is injected. Specifically, as shown in FIG. 1, reflecting mirror 5 has an aperture through which light is injected from light guide 2 that brings light from lamp 1. Light guide 2 can be a circular or rectangular rod of transparent glass or plastic, or a fiber optic bundle, or, especially in the case of sources of visible laser light, one or more optical fibers.

As shown in FIG. 2, light-diffusing layer 6 is affixed to the bottom surface of transparent slab 3. Light-diffusing layer 6 preferably consists of a transparent medium whose index of refraction is less than that of the transparent slab and into which a light diffusing agent such as titanium dioxide powder has been admixed. For example, the lower index medium can be a transparent silicone elastomer such as the one manufactured by Dow Corning under the trade name "Sylgard 184". This transparent silicone has an index of refraction that is less than that of acrylic plastic or glass. With the admixture of $TiO_2$ powder the silicone elastomer loses its transparency and takes on a white appearance. The silicone elastomer adheres to the bottom surface of the light guide.

Light which has been injected into the light guide resonator and is travelling down the transparent slab, reflects off the top and bottom surfaces by the process known as "total internal reflection". At the bottom surface, however, internal reflection is not truly total because the light-diffusing $TiO_2$ particles present in the evanescent of the light field distribution diffuse or scatter some of the light energy in various directions, mostly towards the top in FIG. 1 and 2, i.e. towards the viewers. The light diffused or scattered by light-diffusing layer 6 is the source of diffuse light looked for.

The amount by which internal reflection is less than 100% at the interface with light-diffusing layer 6 depends on the density of light-diffusing particles. By keeping the density of these particles sufficiently low one can make sure that the interface reflectivity is high enough to permit the device to operate in a regime of optical resonance. From the point of view of illumination, and as stated above, the regime of optical resonance looked for here is one where an average light ray making one round trip in the light guide resonator returns to the entrance surface with at least one quarter of its original intensity at injection and with substantially the same angle to the normal of the entrance face of the resonator as it had at injection. When this condition prevails almost all of the light distribution that prevails in the light guide resonator is uniform to better than 25% and the brightness of the light diffuser is correspondingly uniform to substantially the same degree or better.

Figure 3:
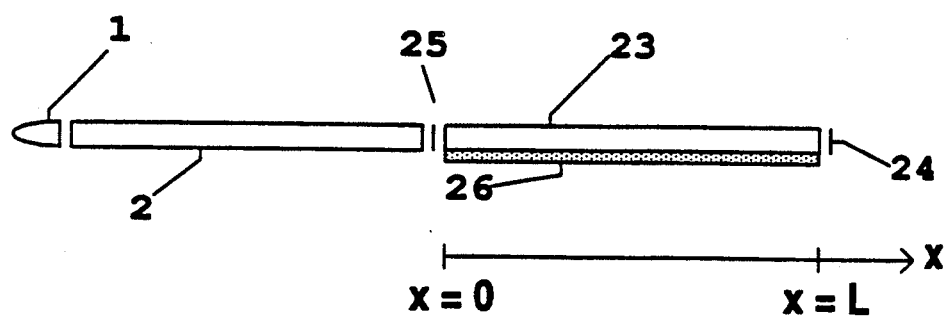
FIG. 3 shows a side view of a variation of the device in FIGS. 1 and 2 where the light-diffusing layer 6 extends over the full length of transparent medium 3.

The uniformity and efficiency of the light guide resonator diffuser can be expressed by a mathematical approximation by considering the following. Refer to FIG. 3 which schematically represents a light guide resonator diffuser in side view. In the case of FIG. 3 light-diffusing layer 26 is made to extend the full length of the transparent slab in order to simplify the mathematical analysis.

Light injected at abcissa $x=0$ through a small aperture in entrance mirror 25 travels to the right in the direction of increasing abcissa x until it reaches return mirror 24 at $x=L$, where L is the length of the light guide. In general the intensity of light injected into a light guide decreases as a result of two distinct processes, absorption and diffusion. Light diffusion is also referred to as light scattering, especially in the physics community. The processes of light absorption and light diffusion (or light scattering) lead to a substantially exponential decrease of the injected light as it travels along the light guide. Let $I_i(x)$ represent the variation of the injected light intensity with distance x averaged over the cross-section of the light guide. For the sake of simplifying our discussion we take $I_i(x=0)=1$. In other words, the averaged intensity of the injected light is taken to be unity in the arbitrary units chosen for this mathematical development.

The light absorption and light diffusion (or light scattering) processes in the light guide be characterized by coefficients $k_a$ and $k_d$ respectively. In $k_d$ we lump together the effect of the light diffusion occurring in the transparent medium 23 itself and in the light diffusing element 26. The injected light intensity, averaged over the guide cross-section, decreases with distance x according to the following approximation:

$$I_i(x) = \exp\{-(k_a + k_d)x\} \quad (1)$$

In this approximation it is assumed that the average light ray injected into the light guide resonator makes a sufficiently small angle with the normal of the entrance face of the resonator that the cosine of this angle can be approximated by unity for the purpose of this discussion. As the light propagates down the length of the light guide and reflects from the mirrors this small angle condition is preserved.

The intensity of the average light ray reflected a first time from mirror 24 and traveling back towards the origin at $x=0$ can be expressed similarly by the equation:

$$I_r(x) = R \exp\{-(k_a + k_d)(2L - x)\} \quad (2)$$

where R is the reflectivity of the mirror averaged over the cross-section of the light guide. The sum intensity of the injected average light ray and the first reflected average light ray is therefore given by:

$$I_i(x) = \exp\{-(k_a + k_d)\} + R\exp\{-(k_a + k_d)(2L - x)\} \quad (3)$$

When the first reflected average light ray returns to mirror 25 it reflects again a second time and travels towards mirror 24 at $x=L$. The fate of this second reflected light is very similar to that of the injected light so that the effect of it and of further reflected light beams on the light intensity profile is to add terms of the same form as equ. (3). Equation (3) therefore describes the variation of the total light intensity with x. Let $I_d(x)$ denote the intensity variation of the light diffused by the light guide. Because we are only interested in deriving a mathematical approximation for the shape $I_d(x)$ of the diffused light and for the ratio of diffused to absorbed light, i.e. the light diffusing efficiency, we can take $I_d(x)$ to be equal to a constant times $I_i(x)$. This holds when the light diffusing element 26 stretches uniformly from $x=0$ to $x=L$ as is assumed to be the case here. $I_d(x)$ has its maximum at $x=0$ and its minimum at $x=L$. The ratio u of $I_d(0)$ to $I_d(L)$ is therefore always larger than unity and is a measure of the light diffusion uniformity. It is given by:

$$u = \{1 + R\exp-2(k_aL + k_dL)\}/\{(1+R)\exp-(k_aL + k_dL)\} \quad (4)$$

When this ratio is less than 1.25 the brightness of the light diffusing element is uniform to within 25%, a degree of uniformity adequate for most applications in displays and lighting.

The efficiency of the light guide resonator diffuser can be derived by finding an expression for the fraction f of the light that is lost by absorption in the light guide and by loss at mirrors 24 and 25. The latter are assumed to have the same reflectivity R averaged over the light guide cross-section. Just before mirror 24 the injected light intensity $I_i(x)$ has value $\{\exp-(k_aL+k_dL)\}$. Fraction $(1-R)$ of this is lost at the mirror. Of the part $\{1-\exp-(k_aL+k_dL)\}$ that disappeared en route to mirror 24 fraction $k_a/(k_a+k_d)$ was lost to absorption in the guide. The weighted sum of these two loss terms gives:

$$f = \frac{\{k_a/(k_a + k_d)\}\{1 - \exp - (k_aL + k_dL)\} + (1 - R)\{\exp - (k_aL + k_dL)\}}{1 - R\exp - (k_aL + k_dL)} \quad (5)$$

Since we are assuming that mirror 25 has the same reflectivity as mirror 24 (proper account being taken of the small apertures for light injection in mirror 25), light reflected from mirror 25 will have the same fate as the initially injected light, i.e. the same fraction will be lost.

The fraction of light that is not lost is diffused and can be used for lighting. We take the light diffusion efficiency e to be given by:

$$e = 1 - f \quad (6)$$

with f given by equ. (5)

In practice the absorption coefficient $k_a$ is determined by the optical quality of the transparent medium and cannot be varied. The light diffusion coefficient $k_d$ can be varied by adjusting the density of light diffusing particles (e.g. titanium dioxide powder) in the light diffusing medium affixed to the transparent medium. Small values of $k_d$ help provide for high uniformity of the diffused light while giving rise to a lower efficiency in the use of light for diffuse lighting. High values of $k_d$ help provide for high efficiency while giving rise to a lesser uniformity in the brightness of the diffused light. Between these two extremes, conditions can be such that there is a range of values $k_d$ where both features can simultaneously be obtained. The necessary conditions can be found by examining the tables of values of efficiency e and u computed by means of the equations described above.

In these tables we list the values of e and u for what we consider to be the minimum and maximum acceptable values of $k_d$. The minimum value of $k_d$, listed as "kdmin" in the tables, is taken to be that for which the light diffusion efficiency is 50% (e=0.50). The maximum value of $k_d$, listed as "kd max" in the tables, is taken to be that for which u=1.25, representing a case where the region of maximum brightness is 25% brighter than the region of minimum brightness. For both values of $k_d$ we have also listed in the tables the value $I_{rt}$ of the second term in equ. (3) which represents the averaged intensity of the injected light upon first returning to mirror 25 after one round trip in the light guide resonator. The values of $I_{rt}$ listed on the fourth line are for $k_d$ equal to the valve kdmin listed on the second line; the values of $I_{rt}$ listed on the seventh line are for $k_d$ equal to the value kd max listed on the fifth line.

In table I the absorption coefficient in the transparent medium is assumed to be such that $k_aL=0.05$. This means an absorption loss of $(1-\exp-0.05)$, i.e. about 5%, in one pass through a length L of light guide, a relatively low optical absorption. Table I shows that as the mirror reflectivity decreases, the light diffusion coefficient $k_d$ has to be made higher and higher to maintain 50% efficiency. The minimum allowable reflectivity for the mirrors is 54% in this case. For lower values of mirror reflectivity R the larger values of $k_d$ that would be required for 50% light diffusion efficiency would result in u values lying above 1.25, i.e. in the domain of nonuniformity. However, when good silvered or other mirrors are used that have 95% reflectivity (R=0.95), the value of $k_d$ can range from 0.10 $L^{-1}$ to 0.62 $L^{-1}$. at this maximum value of $k_d$ light diffusion efficiency is close to 88%. With dielectric mirror coatings reflectivity can rise to 99% and the light diffusion efficiency could theoretically rise above 90% as shown in table I.

Table II shows the case where absorption in the transparent medium is such that $k_aL=0.1$, a situation where about 10% of the injected light is lost by absorption in one pass through the transparent medium of length L. In this case the minimum mirror reflectivity permitted is 61%. At 95% mirror reflectivity the allowed range for $k_d$ is 0.145 to 0.57 $L^{-1}$ with an efficiency close to 81% at the high end.

Table III shows the case where $k_aL=0.2$, a situation where close to 18% of the injected light is absorbed in one pass through the transparent medium of length L. The minimum allowable mirror reflectivity is 77% in this case. At 95% mirror reflectivity the allowed range for $k_d$ is 0.24 to 0.47 $L^{-1}$ with an efficiency of about 66% at the high end.

Finally, table IV shows the case where $k_aL=0.3$, a situation where nearly 26% of the light is lost to absorption in one pass through length L of the transparent medium. This level of absorption is close to the maximum value that is compatible with the regime of optical resonance sought here. Minimum mirror reflectivity is 92%, and at 95% reflectivity the allowed range for $k_d$ is only from 0.336 to 0.367 $L^{-1}$, which would require a very delicate adjusting of the light diffusing particle density.

The values listed in the tables for the intensity $I_{rt}$ of the injected light after one round trip are close to 0.25 for the case where $k_d$ takes on its maximum value compatible with a uniformity parameter u equal to or less than 1.25, i.e. 25% or better uniformity. This value of 0.25 for $I_{rt}$ determines the criterion stated earlier for the regime of optical resonance looked for here, viz. That the average light ray returns after one round trip with at least one quarter of its initial intensity and substantially the same angle to the normal of the entrance face as at injection. The tables show that when this criterion is met one obtains a light diffusion efficiency greater than 50% and a uniformity of light diffusion better than 25%. In optical resonators used for high power lasers it is often the case that the same condition prevails, namely that a typical light ray undergoing one round trip in the resonator returns with one quarter or more of its intensity when the gain medium is not pumped.

We have assumed above that all the scattered or diffused light is useful for lighting. In FIG. 3 the viewer is above and one can make sure that almost all the diffused light goes up towards the viewer by making light-diffusing layer 26 thick compared to the penetration depth of the evanescent light. When this is the case multiple light scattering eventually sends the light back up giving rise to high lighting efficiency.

In order for the input mirror to have a high cross-sectionally averaged reflectivity it is necessary to keep the light injection apertures sufficiently small. For example, to get 95% reflectivity the input mirror should have apertures covering 4% or less of the entrance edge area and dielectric coatings that are 99% or better reflecting. When light is brought in by fiber optic light guides this poses no problem since these typically have a small diameter. With visible laser light sources, which are becoming available in more practical forms thanks to great advances in laser technology, light guide 2 can take the form of an optical fiber whose micron size core carries the laser light. In such a case only micron size apertures are needed in the input mirror.

Figure 4:
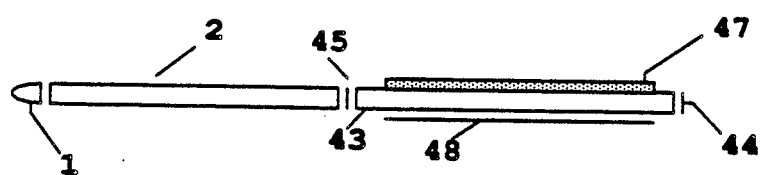
FIG. 4 illustrates a variation of the embodiment in FIGS. 1 and 2 where the light-diffusing layer is affixed to the top surface of the plastic slab. Mirror 48 is optionally placed underneath to increase the efficiency of light utilization.

FIG. 4 shows an alternative arrangement for the light-diffusing layer. In this case layer 47 is thin enough that light can be diffused or scattered towards the top where the observers are located. In this case the refractive index of the matrix housing the light-diffusing particles can be lower or higher than that of the transparent slab. If the index is higher then layer 47 must then have a very smooth top surface so that light entering it is well reflected by total internal reflection at the interface with air. Since about half the light will be scattered in this case towards the bottom, a silver or aluminum mirror 48 can optionally be placed at the bottom as shown to reflect diffused light back up. Or one may wish to view the light from both directions, up and down (corresponding to viewing from the front and from the back when slab 43 is standing vertically), in which case mirror 48 is omitted. Again here it is essential to adjust the density of light-diffusing particles to a density which results in a sufficiently high reflection that the regime of optical resonance defined above prevails in the resonator structure.

Figure 5:
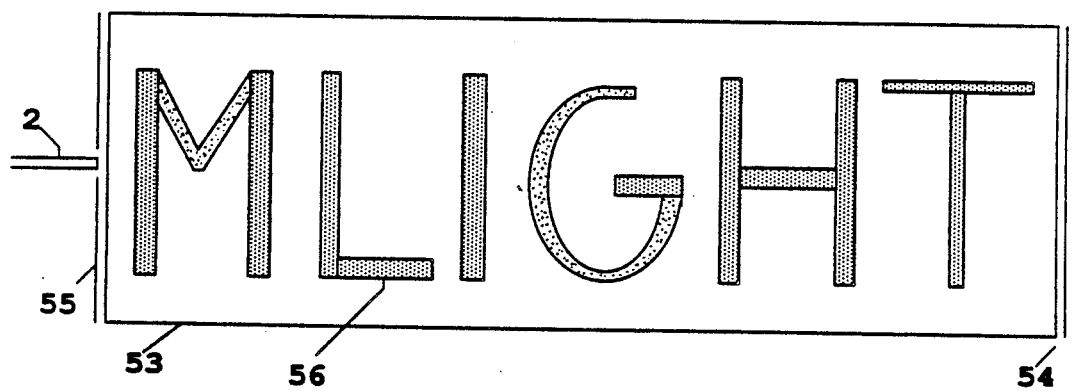
FIG. 5 illustrates a variation in the geometry of the light-diffusing layer so that information or artwork is displayed.

FIG. 5 shows how the light-diffusing layer can be shaped so that it displays a message, as for a lit sign, or artwork. In this case an effective value must be used for $k_d$ by averaging over the cross-section of the guide. With laser light sources, or with halogen lamps equipped with color filters, it is possible to change the color of the injected light. With this device signs with changing colors could be provided.

Figure 6:
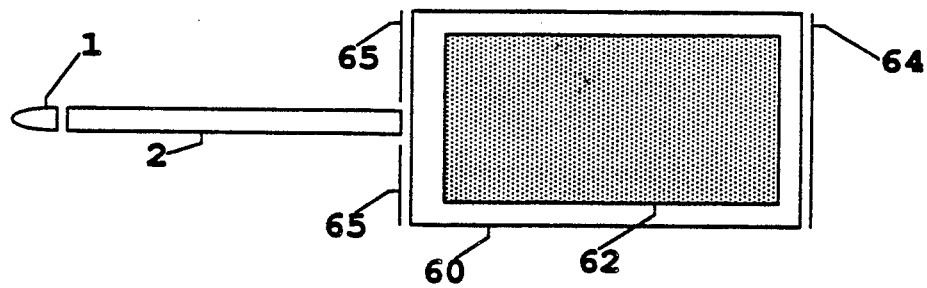
FIG. 6 and 7 show (in top and side view respectively) an implementation of the device shown in FIG. 1 and 2 where the transparent plastic slab has been replaced by a volume of air and light guiding reflections are effected by dielectric or prism light guide mirrors 60.
Figure 7:
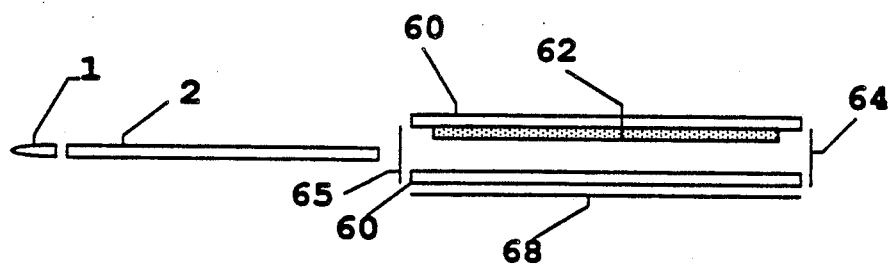

FIG. 6 and 7 show another embodiment of the same principle where the transparent slab has been replaced by a volume of air surrounded by mirrors 60 on the four sides defining the cross-section of the light guide. Mirrors 60 can be dielectric coating mirrors of the type well known in the art, or they can be prism light guide mirrors of the type described in U.S. Pat. No. 4,260,220 entitled "Prism Light Guide Having Surfaces Which Are in Octature", which was granted to Lorne A. Whitehead on April 7, 1981 and assigned to Canadian Patents and Development Limited. Prism light guide mirrors have the important property for the purpose of the present application in that they reflect very well light rays near grazing incidence, such as would be bouncing back and forth between mirrors 64 and 65, and they transmit well light rays near normal incidence, such as would be diffused by light-scattering medium 62. Alternatively light-scattering medium 62 could be omitted and light-diffusing particles or centers could be introduced into the material of the prism light guide mirrors in order to diffuse light out. These prism light guide mirrors can be manufactured at low cost in a variety of forms. As before, the amount of light-scattering taking place in the dielectric or in the prism light guide mirrors, and in the light-diffusing layer, must be kept sufficiently low that the regime of optical resonance can prevail as explained earlier. As before, mirrors 64 and 65, of the dielectric or silvered type, are used to define an optical resonator. A silvered or aluminized mirror 68 is optionally added to reflect diffused light upwards in FIG. 7, i.e. towards the viewer, for increased efficiency.

Figure 8:
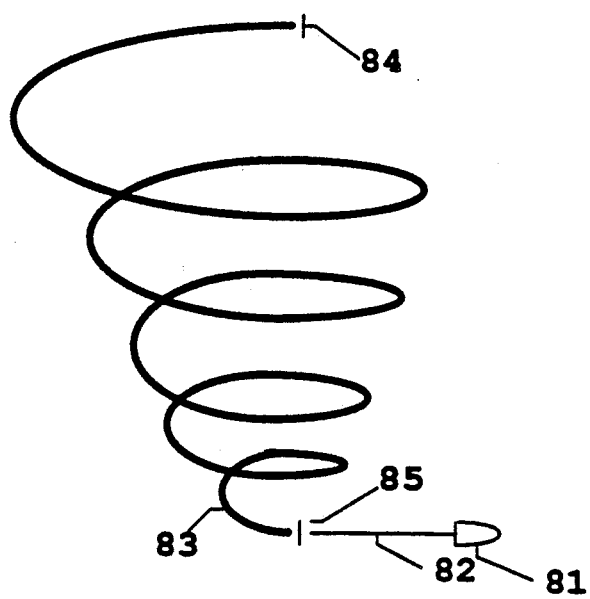
FIG. 8 illustrates an implementation of the general idea where the light guide resonator consists of a coiled-up optical fiber terminated by mirrors 84 and 85.
Figure 9:
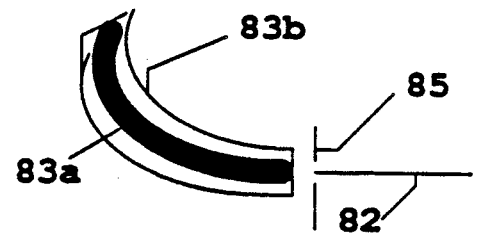
FIG. 9 shows an enlarged picture of the bottom end of the fiber resonator in FIG. 8 showing the small hole in mirror 85 through which light is injected.

FIG. 8 shows a guided light diffuser made from a large core optical fiber terminated at both ends by dielectric mirrors 84 and 85. FIG. 9 shows an enlargement of the light input end of the fiber where light from source 81 is brought in via optical fiber 82 of smaller diameter. A small hole in mirror 85 is made to substantially match the diameter of the light beam emerging from optical fiber 82. As shown in FIG. 9 optical fiber 83 has a core 83a much larger than the diameter of optical fiber 82 and an adequately large cladding 83b. As before light-diffusing particles can be introduced in the plastic cladding to create a source of uniform diffuse light. Another possibility is to have a cladding made from a type of glass that has microscopic inhomogeneities that significantly diffuse or scatter light. Yet another possibility is to rely on the light diffusion or light scattering in the core itself to provide for a source of uniform diffuse lighting. Light diffusion in the core can be increased by adding light-diffusing particles during manufacturing or by using manufacturing techniques that increase the amount of light-scattering over and above the light-scattering that naturally takes place in all transparent materials.

Figure 10:
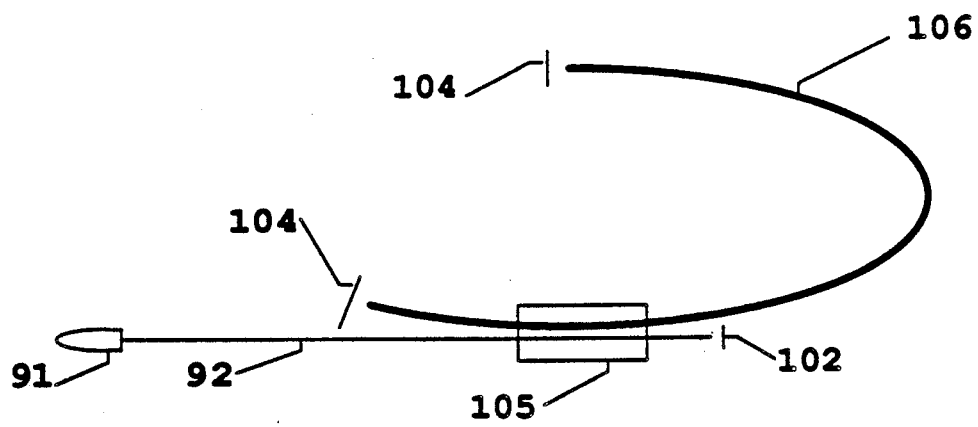
FIG. 10 illustrates another way of injecting light into an optical fiber resonator by means of a directional coupler 105.

FIG. 10 shows another way of coupling light into an optical resonator. In this case a directional coupler 105 is used to couple light from light guide 92 to light guide 106. In directional couplers the light guiding core of one guide passes sufficiently near the core of the other that optical power is coupled from one guide to the other. Directional couplers work also for light going the other way. Therefore we place mirror 102 in FIG. 10 to reflect light back into fiber 92 and thereby send more light into the fiber resonator by utilizing the portion of the light that was not used on the first pass through the directional coupler.

Figure 11:
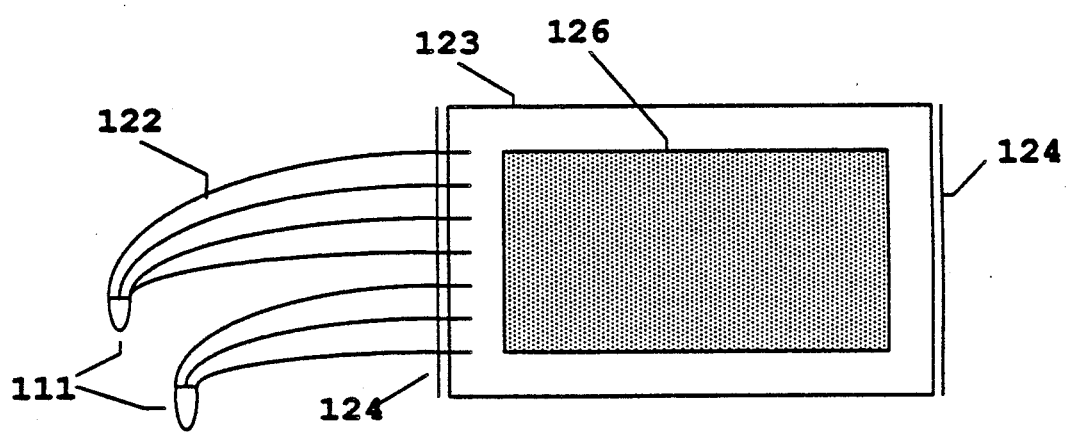
FIG. 11 shows a variation of the device shown in FIG. 1 and 2 where light is injected into the resonator by means of optical fibers 122.
Figure 12:
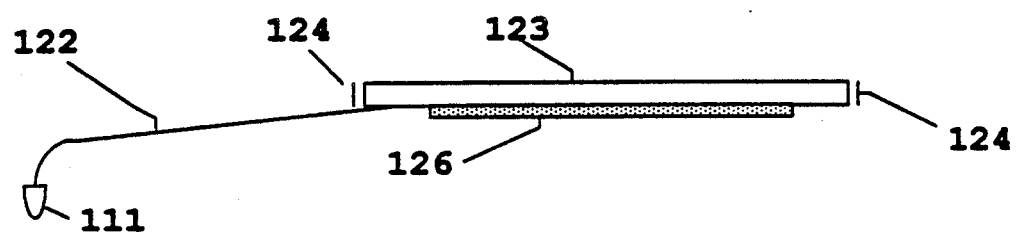
FIG. 12 shows a side view of the device in FIG. 11.

FIGS. 11 and 12 show how light could be coupled into a slab type waveguide resonator by use of input optical fibers 122. In FIG. 12 the fiber ends are cut and polished at a narrow bevel angle with respect to the fiber axis and simply glued to the plastic slab. This gives rise to a coupling coefficient close to unity efficiency. Of course many other ways of coupling light from a small optical fiber light guide into a large optical light guide resonator are well known to those skilled in the art and could be used here.

EXAMPLE

Figure 13:
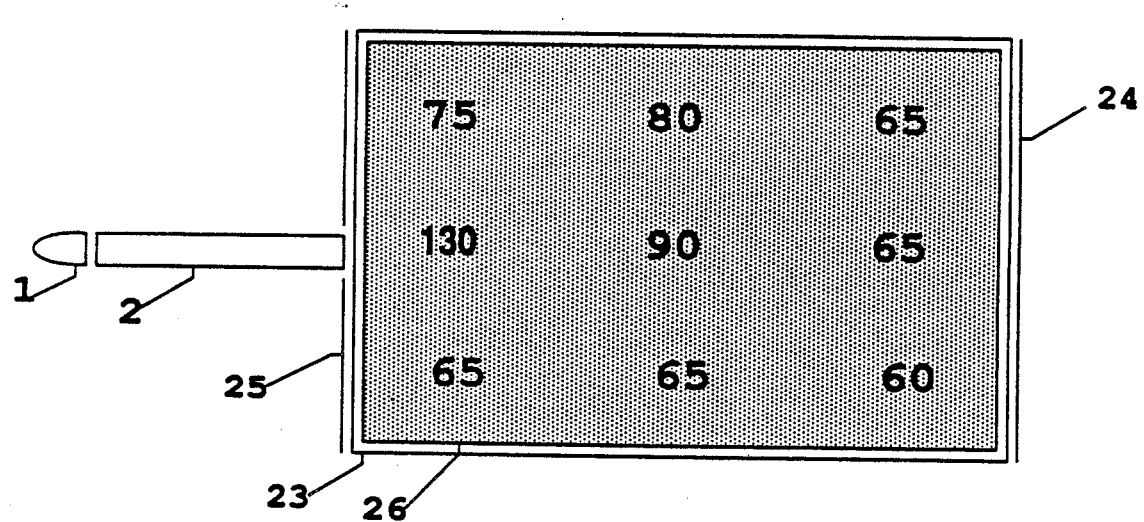
FIG. 13 shows the results of light measurements (expressed in foot-candles) on one implementation of the device shown in FIGS. 1 and 2.

The configuration shown in FIG. 3 was tested experimentally. Transparent slab 23 was a rectangular piece of acrylic plastic 11 by 14 inches in size, 1.0 inch thick (28 by 35 cm, 2.54 cm thick). A 50 watt-halogen lamp, type MR-16 made by Sylvania, was used to inject light into light guide 2 which consisted of an acrylic plastic rod 52 inches (132 cm) long with a rectangular cross-section of dimensions 1.0 by 2.0 inches (2.54 by 5.0 cm). Reflectors 24 and 25 were silvered Mylar plastic films made by 3M. These films were pressed loosely against the two edges of the plastic slab. The light-diffusing layer 26 was prepared in the following way. First 150 grams of Sylgard 184 (Dow Corning trademark) compound were mixed with 15 grams of catalyst supplied by Dow Corning. This transparent silicone elastomer requires 24 hours for curing. During the first 15 minutes of the curing time approximately 20 grams of titanium dioxide powder were mixed thoroughly into the transparent silicone. The mixture that resulted had the appearance of molten marshmallow, i.e. very white and opaque. The now white liquid elastomer compound was spread evenly over the entire surface of the plastic slab. Surface tension kept the liquid from spilling over the edges. The following day the light guide resonator diffuser was tested. The brightness was measured with a light meter held immediately over the top surface of the slab. The light meter readings in footcandles are shown in FIG. 13 in the 9 different places where it was measured. With the exception the one light measurement near the light injection aperture in mirror 25 all readings are within a factor of 1.25 of the average value within the limits of error of the light readings, which was plus or minus 3 footcandles in relative accuracy between the various measurements.

The high value of 130 footcandles near the aperture in mirror 5 on the left is due to the concentrated nature of the light entering at that point. This effect could be greatly diminished by using mutiple light entry points as shown in FIG. 11. It could be entirely eliminated by having the input light guides on their way to the slab gradually flatten out into thin ribbon light guides covering the entire light input edge of the transparent slab.

Although the principle of the present invention has been described with reference to particular embodiments, by way of example, it is understood that modifications may suggest themselves to those skilled in the art and it is intended that such modifications fall within the scope of the claims. For example, it is within the spirit of the present invention that the light guide resonator be comprised of an optical fiber having grating-type fiber mirrors at each end as means for reflecting light back into the light guide. Further, it is also within the spirit of the present invention that the light guide resonator be comprised of an optical fiber having grating-type fiber mirrors at each end as means for reflecting light back into the light guide and that the means for injecting light into the light guide resonator be directional couplers.

TABLE I $k_a = 0.05L^{-1}$

| R | 0.99 | 0.95 | 0.90 | 0.85 | 0.80 | 0.75 | 0.70 | 0.60 | 0.54 |
|---|---|---|---|---|---|---|---|---|---|
| kdmin | 0.06 | 0.10 | 0.14 | 0.18 | 0.22 | 0.26 | 0.30 | 0.37 | 0.41 |
| u | 1.00 | 1.01 | 1.03 | 1.05 | 1.07 | 1.09 | 1.12 | 1.20 | 1.25 |
| Irt | 0.79 | 0.71 | 0.61 | 0.53 | 0.46 | 0.40 | 0.35 | 0.26 | 0.22 |
| kd max | 0.64 | 0.62 | 0.59 | 0.57 | 0.54 | 0.51 | 0.49 | 0.44 | 0.41 |
| emax | 0.92 | 0.88 | 0.83 | 0.78 | 0.73 | 0.68 | 0.64 | 0.55 | 0.50 |
| Irt | 0.25 | 0.25 | 0.25 | 0.25 | 0.24 | 0.24 | 0.24 | 0.24 | 0.22 |

TABLE II $k_a = 0.1L^{-1}$

| R | 0.99 | 0.95 | 0.90 | 0.85 | 0.80 | 0.75 | 0.70 | 0.61 |
|---|---|---|---|---|---|---|---|---|
| kdmin | 0.11 | 0.14 | 0.19 | 0.23 | 0.27 | 0.30 | 0.34 | 0.40 |
| u | 1.02 | 1.04 | 1.06 | 1.08 | 1.10 | 1.14 | 1.18 | 1.25 |
| Irt | 0.65 | 0.58 | 0.51 | 0.44 | 0.38 | 0.33 | 0.29 | 0.25 |
| kd max | 0.59 | 0.57 | 0.54 | 0.52 | 0.49 | 0.46 | 0.44 | 0.40 |
| emax | 0.85 | 0.81 | 0.76 | 0.71 | 0.66 | 0.61 | 0.57 | 0.50 |
| Irt | 0.25 | 0.25 | 0.25 | 0.25 | 0.25 | 0.24 | 0.24 | 0.22 |

TABLE III $k_a = 0.2L^{-1}$

| R | 0.99 | 0.95 | 0.90 | 0.85 | 0.80 | 0.77 |
|---|---|---|---|---|---|---|
| kdmin | 0.21 | 0.24 | 0.28 | 0.31 | 0.35 | 0.37 |
| u | 1.08 | 1.11 | 1.14 | 1.18 | 1.22 | 1.25 |
| Irt | 0.44 | 0.39 | 0.34 | 0.30 | 0.27 | 0.24 |
| kd max | 0.49 | 0.47 | 0.45 | 0.42 | 0.39 | 0.38 |
| emax | 0.70 | 0.66 | 0.62 | 0.57 | 0.53 | 0.50 |
| Irt | 0.25 | 0.25 | 0.25 | 0.25 | 0.25 | 0.24 |

TABLE IV $k_a = 0.3L^{-1}$

| R | 0.99 | 0.98 | 0.95 | 0.92 |
|---|---|---|---|---|
| kdmin | 0.31 | 0.32 | 0.34 | 0.36 |
| u | 1.19 | 1.20 | 1.22 | 1.25 |
| Irt | 0.29 | 0.28 | 0.27 | 0.25 |
| kd max | 0.39 | 0.38 | 0.37 | 0.36 |
| emax | 0.56 | 0.55 | 0.52 | 0.50 |
| Irt | 0.25 | 0.25 | 0.25 | 0.25 |

We claim:

1. Apparatus comprising:

means for injecting light from at least one source of light into a light guide resonator means;

the light guide resonator means comprises (A) a light guide means and (B) means for reflecting most of the light incident thereupon back into the light guide means; and means for diffusing light from at least a portion of the light distributed in the light guide resonator means, wherein a regime of optical resonance prevails in the light guide resonator means.

2. The apparatus of claim 1 wherein the regime of optical resonance comprises the condition that a light ray injected into the light guide resonator means and undergoing one round trip therein, returns on the average with at least one quarter of its initial intensity and with substantially the same angle to the surface normal of its entry face as it had at injection therethrough.

3. The apparatus of claim 1 wherein the light guide means comprises a light-guiding core and the reflecting means comprises two light-reflecting devices which are disposed at each end of the light-guiding core.

4. The apparatus of claim 3 wherein the light-guiding core comprises a slab of transparent material and the diffusing means comprises a layer of material containing light-diffusing particles and having a lower index of refraction than the transparent material of the light-guiding core, the diffusing layer being affixed to the slab.

5. The apparatus of claim 4 where the light-diffusing particles comprise $TiO_2$.

6. The apparatus of claim 1 wherein the light guide resonator means comprises an optical fiber.

7. The apparatus of claim 6 wherein the means for injecting light comprises a directional coupler.

8. The apparatus of claim 1 wherein the light guide means of the light guide resonator means comprises an optical fiber and the means for reflecting comprises grating-type fiber mirrors disposed at each end of the optical fiber.

9. The apparatus of claim 8 wherein the means for injecting light comprises a directional coupler.

10. The apparatus of claim 1 wherein the light guide means has a hollow core and light guiding is provided by dielectric or prism light guide mirrors.

* * * * *